Patented July 1, 1947

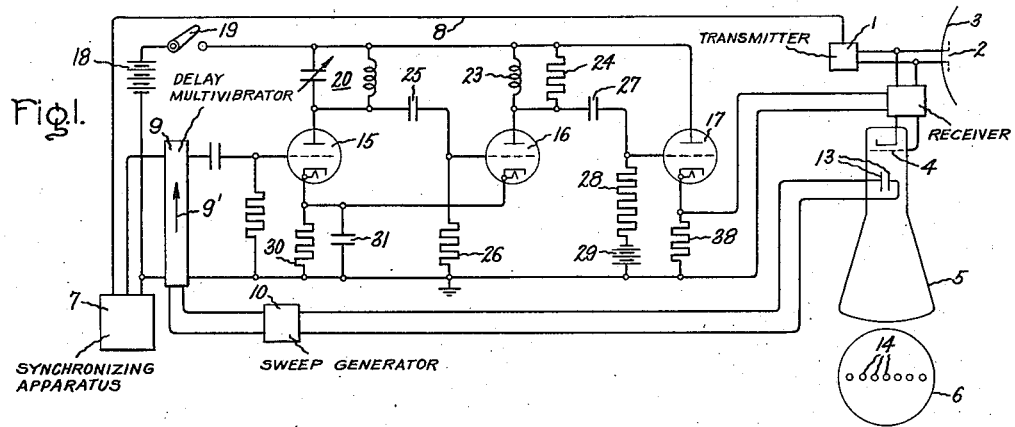
July 1, 1947.  W. A. FITCH  2,423,304
PULSE PRODUCING SYSTEM
Filed Feb. 15, 1944
Inventor:
William A. Fitch,
by Harry E. Dunham
His Attorney.

2,423,304

UNITED STATES PATENT OFFICE 2,423,304

PULSE PRODUCING SYSTEM

William A. Fitch, Schenectady, N. Y., assignor to General Electric Company, a corporation of New York Application February 15, 1944, Serial No. 522,483

4 Claims. (Cl. 315—22)

1

My invention relates to pulse producing systems and it has for one of its objects to provide a system for producing sharp regularly recurring pulses.

Another object of my invention is to provide improved means to produce such pulses for use in connection with the calibration of cathode ray devices used in range measuring apparatus.

Another object of my invention is to provide improved means to produce sharp pulses controlled in frequency by oscillations in an oscillatory circuit but which are unidirectional, of high intensity, and of short duration relative to a cycle of said oscillations.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents my invention and Fig. 2 represents certain characteristics pertaining to its operation.

Referring to Fig. 1 of the drawing I have represented my invention as employed in a radio range system in which pulses produced by a transmitter 1 are radiated from an antenna 2 positioned, as in the usual practice, within a parabolic reflector 3. These pulses are radiated through space and may be reflected from remote objects and thereafter intercepted by the antenna 2 and supplied to a receiver where they are translated to unidirectional pulses and applied to the control electrode 4 of a cathode ray device 5 to produce modulations of the ray visible upon the screen 6 of this device.

The pulses transmitted by the transmitter 1 are synchronized by pulses supplied from synchronizing apparatus 7 over a conductor 8. This same synchronizing apparatus also supplies pulses, preferably through a delay multivibrator 9 and a sweep voltage generator 10 to deflecting electrodes 13 within the cathode ray device 5. The generator 10 produces sawtooth oscillations having the repetition frequency of the radiated pulses and the rising portions of which are initiated simultaneously with or in desired relation to the pulses radiated by the antenna 1. In this way the ray is deflected horizontally across the screen 6 to produce a horizontal line in which variations in intensity appear in accord with any received echo.

The delay multivibrator may produce a pulse

2 wave such as that indicated at A in Fig. 2. This wave is supplied to the sweep generator 10 which produces a sawtooth wave such as that indicated at G in Fig. 2 between the deflecting electrodes 13. This wave deflects the ray across the screen and since the ray is intensity modulated by the received echo, illuminated spots appear on the screen at positions corresponding to the distance to the objects producing the echoes.

In accord with my invention means are provided to produce, upon closing switch 19, equally spaced indicia upon the screen 6 of the cathode ray device, which may be represented by the small dots 14 shown thereon, to provide a calibration on the screen in terms of units of time between the transmitted pulses and received echoes or in terms of distance from which such echoes are received. The positions at which the indications of received echoes appear when switch 19 is open may then be compared with the positions of these dots 14 produced when the switch is closed to ascertain with accuracy the distance from which the echoes are received.

This means comprises the electron discharge devices 15, 16 and 17 connected in cascade, all of these devices being supplied with anode operating potential from a suitable source 18 through the switch 19 which, during calibration of the cathode ray device, is closed. The anode circuit of the device 15 includes an oscillatory circuit 20 and the anode circuit of the device 16 includes an oscillatory circuit represented as an inductance 23. This inductance may have sufficient inherent capacitance to have a natural resonant frequency several times greater than the resonant frequency of the circuit 20. This latter circuit 23 is also highly damped since it is shunted by a resistance 24.

The anode of device 15 is connected to the grid of device 16 through a capacitance 25 the latter grid being connected to ground through a resistance 26. Similarly the anode of device 16 is connected to the grid of device 17 through a capacitance 27 and the grid is connected to ground through a resistance 28 and a suitable source of bias potential 29. The cathodes of devices 15 and 16 are connected to ground through a common resistance 30 shunted by a condenser 31.

In the operation of the system, the delay multivibrator produces negative pulses upon the grid of device 15 such as is represented by the curve A of Fig. 2. The device 15 normally passes current with the result that energy is stored in the inductance of the oscillatory circuit 20 and a bias voltage appears across the resistance capacitance combination 30, 31. This bias voltage is indicated by the left hand portion of curve C of Fig. 2. This bias voltage is present between the grid and cathode of device 16 and renders that device nonconductive. When the negative pulse produced by the multivibrator 9 appears upon the grid, it interrupts this current and the energy of the oscillatory circuit is dissipated in oscillations therein as represented by the curve B of Fig. 2. Simultaneously with the appearance of these oscillations B in the circuit 20, the charge on condenser 31 leaks off through resistance 30 in accord with the portions 33 of the curve C of Fig. 2. Curve D of Fig. 2 represents the voltage produced between the control electrode of device 16 and the cathode. This voltage comprises the oscillations B generated in the circuit 20 superimposed on the bias voltage which appears upon resistance 30 and such additional bias voltage as exists across resistance 26.

The rate of decay of the bias voltage on resistance 30 is such that this voltage and the bias voltage on resistance 26 due to grid current in device 16 results in a negative bias voltage on the grid of device 16 with respect to the cathode during the negative pulses of wave A as represented by the portions 35 of the curve D. The rate of decay of this voltage is so related to the rate of decay of the oscillations B in circuit 20 that device 16 passes current only during the extreme positive peaks of the oscillations B. These oscillations are shown superposed on the portion 35 of the curve D and as projecting above line 21 corresponding to the cutoff voltage between the grid and cathode of this device 16 by a constant amount throughout the decay of these oscillations. During each of these positive peaks a pulse of current is produced in the anode circuit of device 16, one pulse occurring during each cycle of the oscillations in the circuit 20. Because of the decaying bias and corresponding decaying intensity of the oscillations B, these pulses of anode current are of substantially constant intensity.

The inductance 23, being resonant at a frequency much higher than that of the circuit 20, is excited by these short pulses of anode current flowing in this device thereby producing a train of highly damped oscillations such as those indicated at 36 in the circuit E of Fig. 2. These trains of oscillations, each of which comprises an initial intense peak and other very rapidly diminishing peaks, are supplied to the grid of device 17 which is maintained strongly negative by the source of bias potential 29. Thus current flows in its anode circuit and in resistance 38 only during the first peak of each of the trains 36 with the result that pulses of current such as those indicated at 37 in the curve F of Fig. 2 appear upon resistance 38. These voltage pulses which appear upon resistance 38 are supplied to the receiver 3 and through the circuits thereof to the grid 4 of the cathode ray device to produce the regularly spaced illuminated spots or indicia 14 on the screen.

The negative pulses of the wave A, as previously stated, may be initiated either simultaneously with radiation of the periodic pulses from antenna 2 or at a variable time thereafter dependent upon the adjustment of the multivibrator 9. That the period of delay between radiation of a pulse and beginning of a negative pulse of wave A is variable is indicated by the arrow 9' on the rectangle 9. This device 9 may, if desired, be calibrated in terms of the time interval or corresponding distance in yards between the radiated pulse and the beginning of these negative pulses. The additional distance which is represented on the screen and divided in equal parts by the spots 14 comprises the total range of the equipment for any particular adjustment of multivibrator 9.

The equipment may normally be used with switch 19 open, the distance being determined by multivibrator 9 and the position of the echo indications on the screen. When it is desired to calibrate the equipment, switch 19 is closed and the indicia 14 then appear on the screen and the position of any echo indication may then be compared with these indicia as a calibration of range. If desired, during such calibration, the radiation of pulses may be interrupted, or the sensitivity of the receiver may be reduced so that received echoes of transmitted pulses are not transmitted therethrough with the intensity of the locally generated, or artificial, echoes represented by the pulses of the curve F. In this way the indicia 14 appear clearly on the screen.

While I have illustrated a particular embodiment of my invention, it will of course be understood that I do not wish to be limited thereto since various modifications both in the circuit arrangement and in the instrumentalities employed may be made, and I contemplate by the appended claims to cover any such modifications as fall within the true spirit and scope of my invention.

What I claim as new and desire to secure by Letters Patent of the United States is:

1. In combination, a cathode ray device having a viewing screen, an oscillatory circuit, means to deflect the ray of said device across said screen and simultaneously to excite said circuit, means to produce sharp spaced indicia on said screen, said means comprising means to generate a damped train of oscillations in response to each cycle of oscillations in said circuit, and means to modulate the ray of said device during its deflections in accord with the successive peaks of said recurring trains of oscillations which exceed a predetermined amplitude.

2. In combination, a cathode ray device having a viewing screen, an oscillatory circuit, means to deflect the ray of said device across said screen in a predetermined period and to excite oscillations in said circuit having the natural period thereof, means to produce sharp spaced indicia on said screen, said means comprising means to generate a highly damped train of oscillations in response to each cycle of oscillations in said circuit, and means to modulate the ray of said device in accord with one peak of each of said trains to produce said equally spaced indicia, said natural period being related to the rate of deflection of said beam to produce desired spacing of said indicia.

3. In combination, a cathode ray device having a viewing screen, a pair of cascade connected electron discharge devices, each having an anode, a cathode and a control electrode, an oscillatory circuit connected between the anode and cathode of the first of said devices, a highly damped oscillatory circuit resonant at a frequency much higher than the resonant frequency of said first circuit connected between the anode and cathode of the second of said devices, means to deflect the ray of said cathode ray device across said screen and to interrupt current in said first device whereby both of said oscillatory circuits oscillate and successive highly damped trains of oscillations appear in said higher frequency circuit, and means to modulate said ray during said deflection in accord with the highest peaks of one polarity of each of said trains.

4. In combination, a pair of electron discharge devices connected in cascade, each having an anode, a cathode and a control electrode, said cathodes being connected together, a source of operating potential connected between the respective anodes and cathodes, an oscillatory circuit between each anode and said cathodes, a parallel resistance capacitance combination connected between said cathodes and the negative terminal of said source, the control electrode of said second device being connected for bias potential to said cathodes through said resistance capacitance combination and to the anode of the first of said devices for high frequency oscillations, means to interrupt current in the first of said devices thereby to excite oscillations in the oscillatory circuit connected to its anode whereby a decaying train of oscillations is supplied to the control electrode of the second device, said resistance and capacitance combinations being so proportioned that the voltage thereon decays at a rate such that pulses of current of uniform intensity appear in the anode of the second device and excite the oscillatory circuit connected thereto, and an output circuit capable of passing only peaks of oscillations in said last oscillatory circuit.

WILLIAM A. FITCH.

REFERENCES CITED

The following references are of record in the file of this patent:

UNITED STATES PATENTS

| Number | Name | Date |
| --- | --- | --- |
| 2,266,668 | Tubbs | Dec. 16, 1941 |
| 2,178,074 | Jakel et al. | Oct. 31, 1939 |
| 2,101,520 | Tolson et al. | Dec. 7, 1937 |
| 2,121,359 | Luck et al. | June 21, 1938 |
| 2,234,830 | Norton | Mar. 11, 1941 |
| 1,708,530 | Von Arco | Apr. 9, 1929 |
| 1,756,131 | Ohl | Apr. 29, 1930 |
| 1,773,556 | Von Arco | Aug. 19, 1930 |
| 1,908,249 | Hund | May 9, 1933 |
| 2,000,362 | Terman | May 7, 1935 |
| 2,086,918 | Luck | July 13, 1937 |
| 2,103,090 | Plebanski | Dec. 21, 1937 |
| 2,277,000 | Bingley | Mar. 7, 1942 |

OTHER REFERENCES

Sherman "Generation of Synchronizing Pulses by Impulse Excitation," Proceedings of I. R. E. Sept. 1940, pages 406 to 409, inclusive.

Disclaimer 2,423,304.—*William A. Fitch*, Schenectady, N. Y. PULSE PRODUCING SYSTEM. Patent dated July 1, 1947. Disclaimer filed Sept. 1, 1948, by the assignee, *General Electric Company*.

Hereby enters this disclaimer to claims 1 and 2 of said patent.

[*Official Gazette October 5, 1948.*]